M. B. LLOYD.
CONTINUOUS WELDING MECHANISM.
APPLICATION FILED APR. 15, 1912.
1,124,760.
Patented Jan. 12, 1915.
5 SHEETS—SHEET 1.
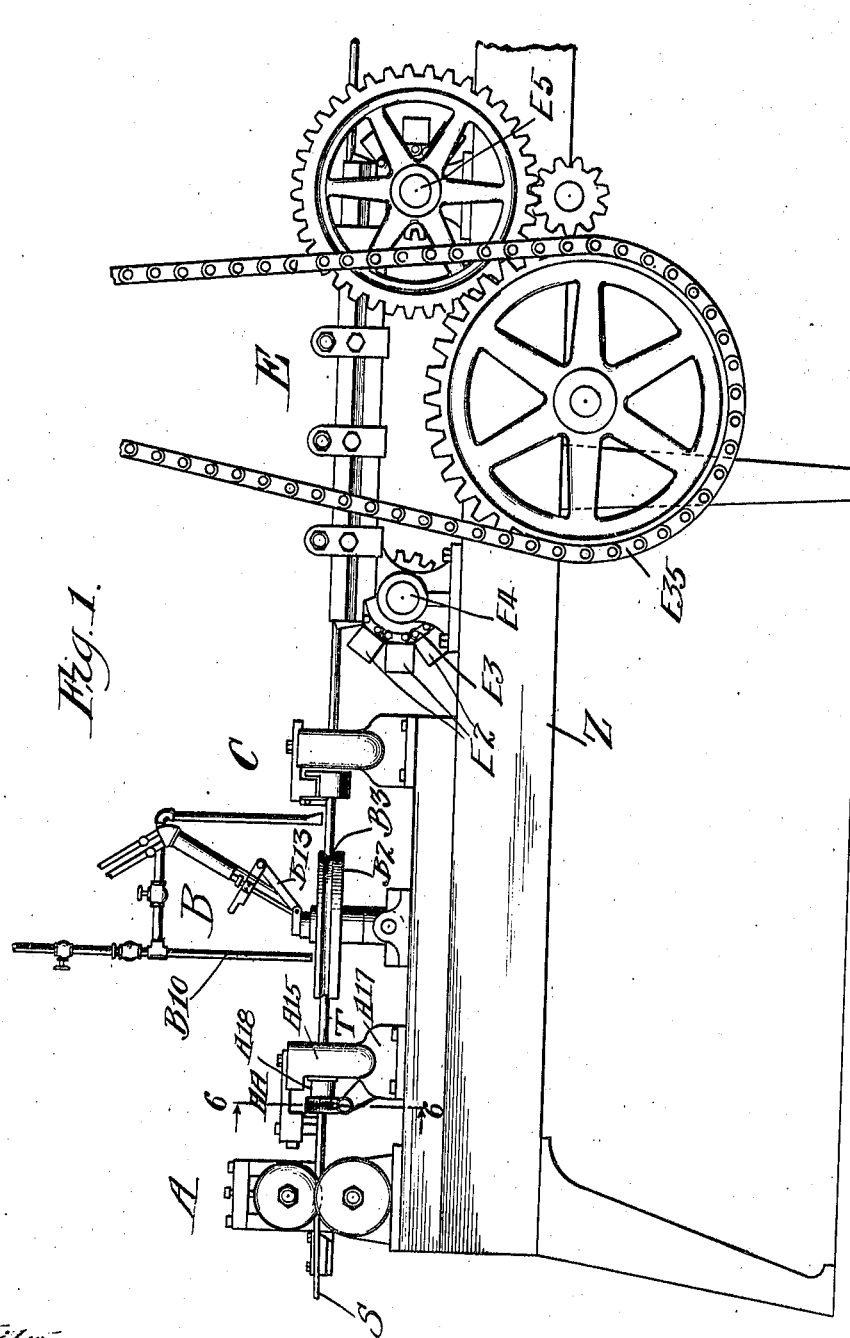
Witnesses:
Earl E. Howe
Robert S. McEadie
Inventor.
Marshall B. Lloyd
by 

M. B. LLOYD.
CONTINUOUS WELDING MECHANISM.
APPLICATION FILED APR. 15, 1912.
1,124,760.
Patented Jan. 12, 1915.
5 SHEETS—SHEET 2.
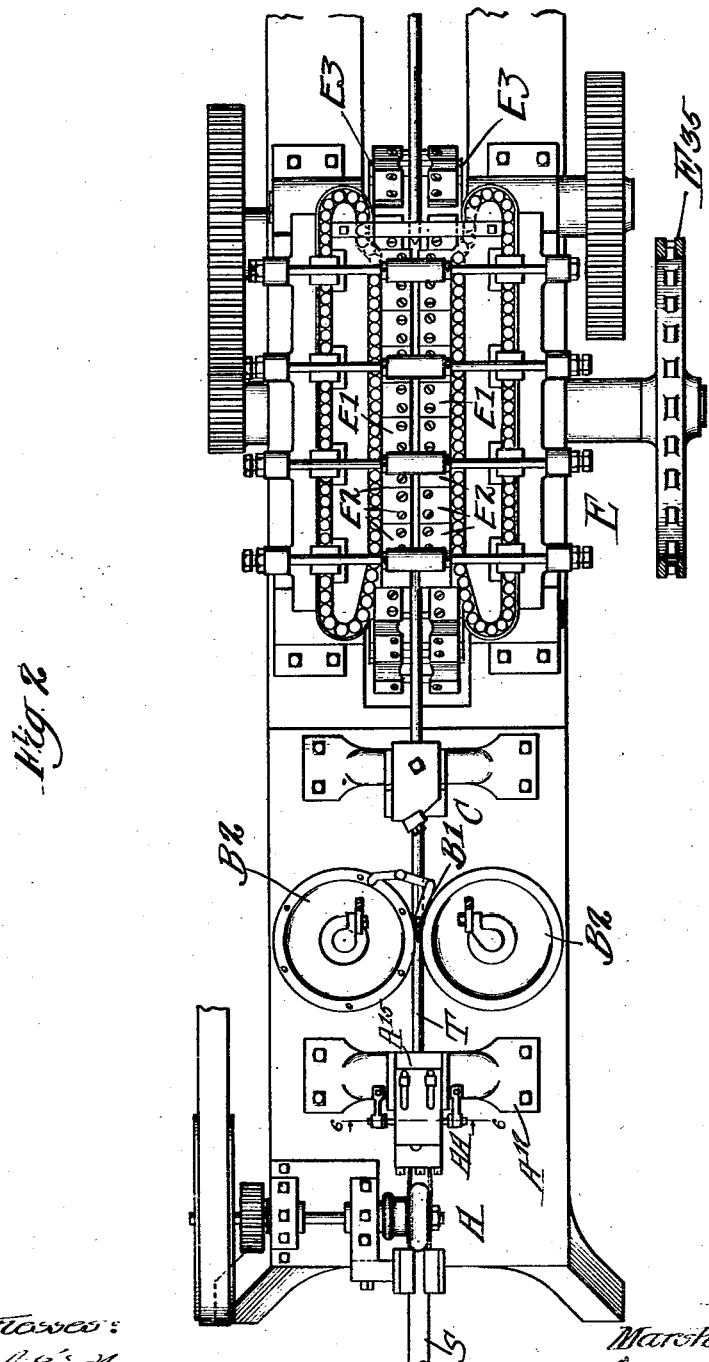

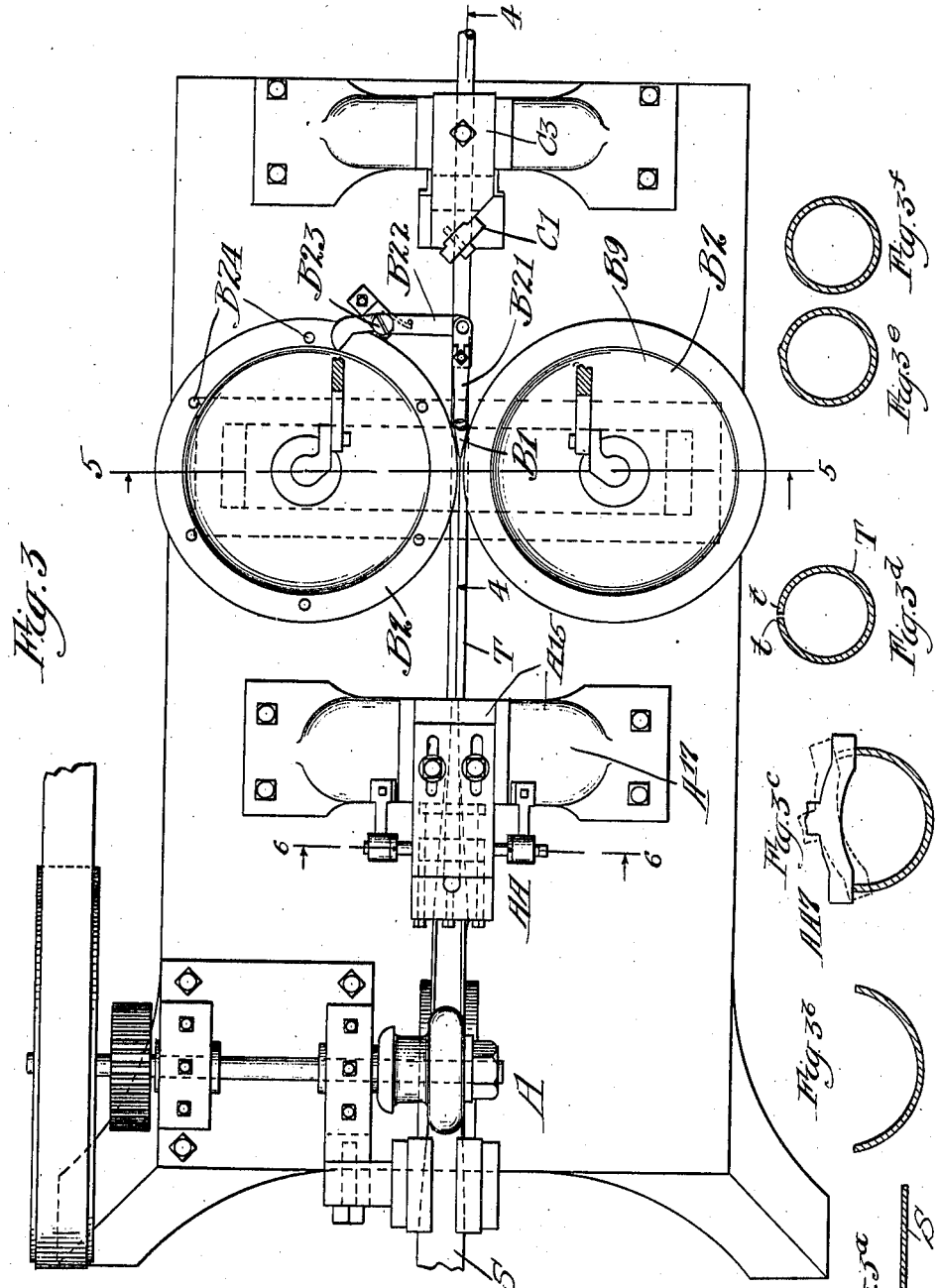

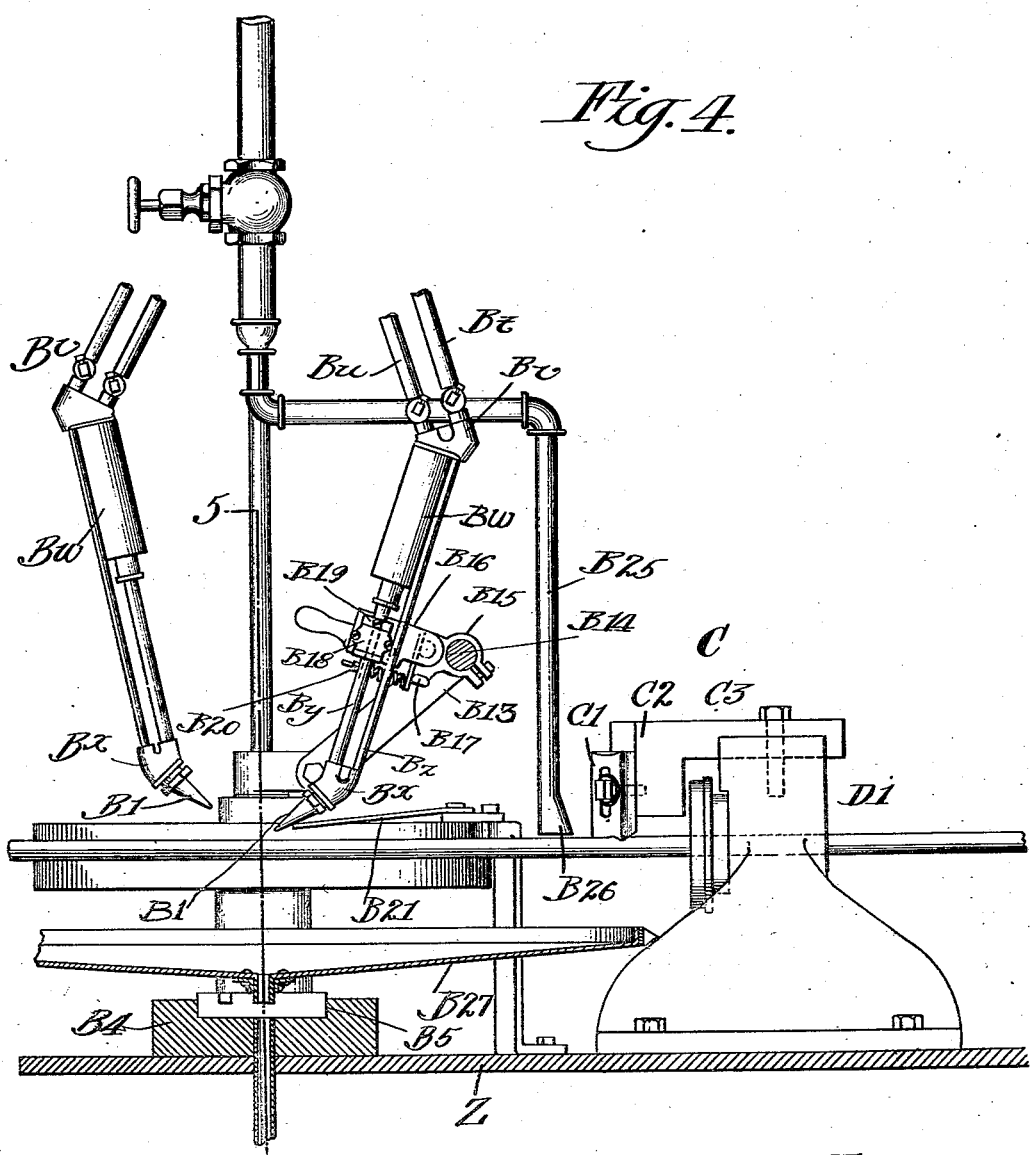

M. B. LLOYD.
CONTINUOUS WELDING MECHANISM.
APPLICATION FILED APR. 15, 1912.
1,124,760.
Patented Jan. 12, 1915.
5 SHEETS—SHEET 5.
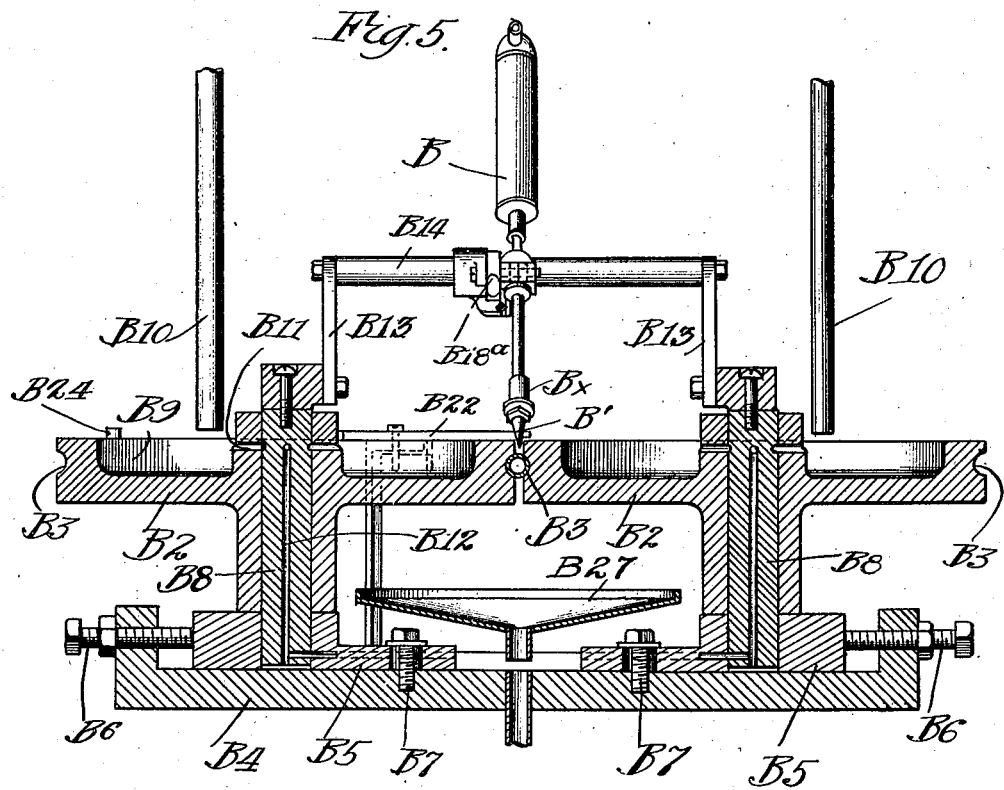
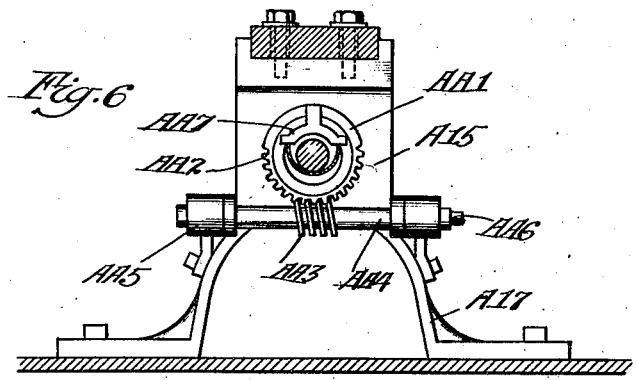

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

CONTINUOUS WELDING MECHANISM.

1,124,760.  Specification of Letters Patent.  Patented Jan. 12, 1915.

Original application filed July 12, 1911, Serial No. 638,203. Divided and this application filed April 15, 1912. Serial No. 690,934.

*To all whom it may concern:*

Be it known that I, MARSHALL BURNS LLOYD, a citizen of the United States, and a resident of Menominee, Menominee county, Michigan, have invented certain new and useful Improvements in Continuous Welding Mechanism, of which the following is a specification.

My invention relates to improvements in machines for manufacturing welded metal tubing.

The object of my invention is to provide a mechanism which shall be adapted to weld metal tubing, and particularly thin-walled metal tubing, more rapidly, more perfectly, more economically and with much less manual labor than has been possible hitherto.

Another object of my invention is to provide a mechanism by means of which metal tubing may be welded continuously.

A special object of my invention is to provide a continuous welding mechanism of such construction that metal tubing formed from strip stock may be continuously welded and shaped, without manual handling or intervention, and within a minimum of time and space.

A further and particular object of this invention is to provide an automatic mechanism for carrying out certain steps of the improvements in the art of manufacturing metal tubing which are described and claimed in my copending application filed July 12, 1911, Serial No. 638,202 and particularly described in my divisional process application Serial No. 682,704, filed March 9th, 1912.

This present application is a division of my copending application Serial No. 638,203, filed July 12, 1911, entitled Continuous tube mill.

My invention consists in mechanism for setting tubes or tubing in motion longitudinally, in combination with rotary means located at one point in the path of the moving tubing whereby the seam edges of the tubing are progressively positioned for welding, and a gas flame torch for applying a welding heat to the seam edges thus positioned, to unite said edges. The means which I employ for applying the welding heat preferably comprises an oxy-acetylene gas torch having its nozzle positioned to direct or play its flame upon the seam edges at the point where they are thus held. My invention also contemplates the application of pressure and the chilling of the tubing at the point mentioned, both through the medium of said rotary means, for purposes hereinafter set forth.

My invention also consists in various constructions and combinations of parts for accomplishing the effects above set forth, all as hereinafter described and particularly pointed out in the claims.

My invention will be more readily understood by reference to the accompanying drawings, forming part of this specification, and in which:

Figure 1 is a partial side elevation of a continuous tube mill equipped with a welding mechanism embodying my invention; Fig. 2 is a plan view thereof; Fig. 3 is an enlarged plan view of the welding devices; Figs. $3^a$, $3^b$, $3^c$, $3^d$, $3^e$ and $3^f$ are cross-sectional views, illustrating the evolution or development of the tube, in a machine of the particular kind herein shown. Fig. 4 is an enlarged vertical, longitudinal section of the welding mechanism on the line 4—4 of Fig. 3; Fig. 5 is a vertical cross section on the line 5—5 of Figs. 3 and 4; and Fig. 6 is an enlarged transverse section on the line 6—6 of Figs. 1 and 3, clearly illustrating the seam positioning device employed in a machine of the type herein illustrated.

The complete apparatus or mechanism herein illustrated belongs to a continuous tube mill which is described and claimed in my copending application Serial Number 638,203. This present invention is in no wise limited to the precise welding mechanism herein illustrated, for it may readily be modified by one who is skilled in the art, without departing from the scope of the invention as set forth in the appended claims. These improvements are applicable in and greatly simplify those processes of manufacturing tubing which are characterized by the addition of metal with which to close the seam of the tube; as for example, the process of manufacturing brazed tubing, as distinguished from the autogenous welding herein described.

In the drawings, Z, represents a strong table or bench, which supports the several operating parts of the machine. At one end of this bench is a tube-forming mechanism A. Next to the tube forming mechanism is a welding mechanism B, and then follows a bur-removing mechanism C. The working parts and faces of the several mechanisms on the bench are preferably arranged in longitudinal working alinement, and any given piece or length of tubing material which occupies the machine, considered from end to end thereof, is therefore maintained in straight line, non-distorted condition, while it (such piece or length) is being acted upon by the several mechanisms.

The stock S enters the forming mechanism A and emerges therefrom as tubing T, passing through a die $A^{15}$ in the standard $A^{17}$. The several stages of the development of the tubing are depicted in Figs. $3^a$, $3^b$, $3^c$ and $3^d$. Fig. $3^a$ shows the cross section of the strip stock; Fig. $3^b$ shows the cross section of the strip when partially formed; Fig. $3^c$ shows its form at the moment that it is about to enter the die $A^{15}$; and Fig. $3^d$ shows the form of the tube as it emerges from the die $A^{15}$. The edges of the metal strip are indicated by the character, $t$, throughout; and as shown in Fig. $3^d$ these edges are in substantial abutment when the tube leaves the forming die $A^{15}$. These abutting edges, separated by a very narrow crack, constitute the seam which is to be closed. At the moment that the material emerges from the forming mechanism A, it has taken on its form as a tube, and, as indicated, presents its open seam at the top. The nature of the welding mechanism is such as to require the seam of the tube to occupy a definite or substantially definite plane or position, and to prepare the tubing for reception by other parts of the welding mechanism, I employ a tube-seam-positioning device. In the drawings, this seam positioning device is indicated by the character AA. Due to various causes, the initial seam or seam edges of the tubing are often spirally twisted or at least an irregular or wavy seam. The positioning device effects the correction of this tendency and causes the tubing to emerge from die $A^{15}$ and enter the welding mechanism with the seam of the tubing in substantially exact alinement with the axis of the tubing and directly above said axis. The tube seam positioning device may partake of various forms and it may be arranged within the confines of the forming mechanism or may be interposed between the die $A^{15}$ and the welding mechanism. The particular device shown in the drawings is arranged at the throat of the die $A^{15}$ and its construction is fully shown in Figs. 1, 2 and 6. The die $A^{15}$ is provided with a sleeve $A^{18}$ through which the tube is forcibly drawn and the inner end of the sleeve $A^{18}$ is provided with a rotatable collar or ring $AA^1$ having worm wheel teeth $AA^2$ which mesh with a worm $AA^3$ on a cross shaft $AA^4$. This shaft is held in bearings $AA^5$ on the block $A^{17}$ and is provided with a squared end $AA^6$ to which a wrench may be applied to turn the shaft and the worm wheel. The collar carries a short cross bar $AA^7$ best shown in Fig. $3^c$ and Fig. 6. This bar is made of hardened steel and it is so positioned that the edges of the partially formed strip engage therewith, as shown in Figs. $3^c$ and 6. By rotating the collar $AA^1$ the cross bar $AA^7$ may be tipped or tilted to depress one or the other edge of the partially formed metal strip, and in this manner the tendency of the strip to creep or twist laterally or circumferentially in the dies may be corrected. Only occasional adjustment of the positioning device AA is required to maintain the seam of the tubing in correct position.

The operation of the welding mechanism proper, B, is such that the abutting edges, $t$, $t$, of the tubing are welded together as rapidly as the tubing moves forward. I may employ welding or seam-closing mechanism of various kinds in lieu of the gas-flame welder shown in the drawings, but I find this particular device to be best suited to usual requirements. The construction and operation of the welding mechanism will be quickly understood by reference to Figs. 1, 2, 3, $3^d$, $3^e$, 4 and 5. One element of the welding mechanism B is a gas torch, of which B' is the burner tip or nozzle. This nozzle is formed to emit a fine narrow flame and the nozzle is so positioned as to direct the flame upon the seam edges of the tubing. The position of the seam is governed and assured by the positioning device hereinbefore described, and the position of the tube, as a whole, with reference to the burner tip on the nozzle is regulated and assured by the operation of parts of the welding mechanism about to be described. With these factors defined, the torch may be fixed or stationary with respect to the forwardly moving tubing. The parts which hold the tubing (cross-sectionally considered as a whole) in given relation to the torch nozzle are preferably two large rolls $B^2$—$B^2$, which rotate on vertical axes. These rolls contain peripheral grooves, $B^3$, that fit the sides of the formed tubing, in the manner shown in Fig. 5. These horizontal rolls, $B^2$, determine the position of tubing both horizontally and laterally; that is they serve to hold the tubing against lateral movement in any direction at the welding point without interfering with the forward movement of the tubing. Preferably, these rolls $B^2$ do not meet but instead leave the extreme top and seam of the tubing exposed to the welding flame. By horizontal adjustment the rolls, $B^2$, $B^2$ may be caused to press upon the sides of the tubing and thus press the seam edges of the tubing more or less firmly together, as may be required to insure the proper welding thereof. On the bench Z is a transverse guide-way, $B^4$, containing blocks $B^5$ which are adjustably secured therein by several screws $B^6$, $B^7$. The upright shafts $B^8$ of the rolls $B^2$ rise from the blocks $B^5$ and it is by this device that the rolls $B^2$ are adjusted with respect to the interposed tubing. I prefer to cool the holding and pressure parts, by applying water thereto. Thus, in the machine herein illustrated, the rolls $B^2$ have cups or recesses $B^9$ in their tops, and the water flows into these from the pipes $B^{10}$;—overflow is prevented by drain passages and ports $B^{11}$ and $B^{12}$ in the hubs of the rolls $B^2$ and in the non-rotative shafts $B^8$ thereof. The location of the heating or welding zone is determined by the position of the torch nozzle, and as stated the position of the tube in this zone is determined by the holding or pressure rolls $B^2$. The torch used is an approved type of oxy-acetylene gas torch. Any torch or burner of suitable type may be substituted for the torch shown, and one which utilizes a non-carbonaceous gas mixture may be advantageously employed in the production of certain kinds of tubing. I do not claim the torch proper as my invention. It comprises the nozzle $B'$, the gas mixing head $B^x$, the gas pipes $B^y$ and $B^z$, the cylinder $B^w$ and the head $B^v$ containing the regulating valves and equipped with nipples to which respective flexible gas pipes $B^u$ and $B^t$ are joined, said pipes being connected with sources of oxygen and acetylene. The gases, being supplied in proper proportions, when ignited burn with great intensity directly at the nozzle. The flame emitted may be described as of two parts, the first being a short intensely hot flame and, the second, a large relatively far extending corona of lower temperature. An instant's application of the short narrow flame to the edges of the metal tubing causes them to become molten and to flow together. Then if either the flame or the tube be removed the metal cools, leaving the edges in welded condition. Careful regulation of the flame, and of the distance between the nozzle and the tubing, and of the speed of movement of the tubing, are required to produce a uniform continuous weld, and these regulations are all accurately accomplished by the herein described machine or mill. The welding torch, as clearly shown in Figs. 3, 4 and 5, is positioned to direct the flame downwardly and rearwardly at an angle to the tubing, so that the flame enters between the rolls $B^2$ and the corona spreads along the top of the tubing toward the die block $A^{17}$. One purpose of the arrangement is to utilize otherwise wasted heat, to preheat the edges of the seam in advance of actual welding by the intensely hot short flame before referred to. The preheating may be increased if desired by another torch, as indicated in Fig. 4. Any such preheating lessens the time required to weld the seam and consequently permits the tubing to be passed through the machine more rapidly. The welding torch is supported in such manner that it may be quickly adjusted to working position or moved away. Figs. 4 and 5 disclose the parts by which the torch is thus supported. $B^{13}$ are brackets extending from the upper ends of the stud shafts $B^8$ and carrying a cross rod $B^{14}$, at about the middle of which is an adjustable but normally fixed arm $B^{15}$. Pivoted on the end of arm $B^{15}$, is a torch-carrying lever $B^{16}$ and the arm and lever are provided with stop shoulders $B^{17}$ by which the downward movement of the lever is limited. $B^{18}$ is a split clamping block containing a split sleeve $B^{19}$. The part $B^{18}$ is connected to the lever $B^{16}$ by a horizontal stud $B^{18a}$ and the sleeve $B^{19}$ is fastened on to the torch member $B^y$. This arrangement permits two independent movements of the torch, the first being swinging movement in a vertical plane, $i. e.$, in the plane in which it moves on the pivot in arm $B^{15}$, and the second movement permitted being rotation in the block $B^{18}$. Obviously these movements admit of any desired manual adjustment of the torch nozzle, with respect to the tubing between the rolls $B^2$. For limiting the vertical swing of the torch and to enable the nice adjustment of the nozzle, the block $B^{18}$ and the lever $B^{16}$ are connected by a spring resisted thumb screw $B^{20}$. By turning this, the torch may be swung with respect to the lever $B^{16}$, to raise or lower the nozzle. By raising the free end of the lever $B^{16}$, the torch may be quickly swung away from the tubing, without disturbing the nice adjustment of the thumb screw $B^{20}$ and the stop shoulder $B^{17}$; and when again lowered the nozzle will assume its correct relation to the seam of the tubing. If the flame chances to play at one side or the other of the seam the defect may be quickly remedied by twisting the torch and sleeve $B^{19}$ in the block $B^{18}$. Metal which is vaporized by the welding flame sometimes condenses upon the tip of the nozzle and tends to distort the welding flame. The metal thus deposited may be easily knocked off the nozzle. To relieve the attendant from that duty an automatic knock-off device is provided, the same comprising a light metal finger or bar $B^{21}$ which is carried by the lever $B^{22}$, pivoted at $B^{23}$, see Figs. 3, 4 and 5. One of the two rolls $B^2$ is provided with a series of lugs or pins $B^{24}$ which strike and operate the end of the lever $B^{22}$, thereby reciprocating the finger $B^{21}$. The lever and finger are returned by a spring. The end of the finger is concaved to fit the nozzle, and each time that it is thrust back by the lever and lugs, it scrapes or knocks the accumulated metal off the nozzle tip. From the foregoing it will be clear that the confined abutting edges of the tube are welded together at the instant of passage between the holding rolls $B^2$ or at the instant immediately following the full impingement of the welding flame. It will also be clear that this welding operation goes on steadily as fast as the tubing is fed or drawn into the welding mechanism. Attention is called to the very small area or portion of the tube which is exposed to the hot flame between the rolls $B^2$ of the welding mechanism. While the circumferential remainder of the tube is heated as it approaches the torch, on arriving at the rolls $B^2$ it is chilled thereby. This chilling prevents its attaining a red heat except in the exposed parts, and in this way possible distortion of the tubing is prevented, and it is permitted to retain nearly the whole of its strength, which latter is seen to be of prime importance when the resistance of the forming mechanism and the heavy pulling force of the traveling vise are considered.

As an intermediate step of my process, I cool the welded portion of the tubing as fast as it emerges from the welding mechanism; accomplishing this in the machine shown, by spraying water upon the tubing from a pipe, $B^{25}$, having a flat nozzle, $B^{26}$, at its lower end. The water from the several places of use is conducted away by a drain; that from the spray nozzle $B^{26}$ falling into a drain pan $B^{27}$. A further purpose in cooling the tubing after it is welded, is to prepare it for the removal of the raised seam or bur (indicated in Fig. 3$^e$) which usually forms on the top of the tubing during the welding operation. If the tube were allowed to remain hot it would detrimentally affect any bur removing tool which is used. As previously stated, it is preferable to remove the bur immediately after the tubing is welded and before performing any further operations thereon, but it should be understood that this operation may follow or be merged with other operations. The bur removing mechanism C, appears in Figs. 1, 2, 3 and 4 of the drawings. For circular or oval tubing, it comprises a planer knife, tool or blade $C^1$, positioned in alinement with the tubing and which conforms to the top thereof. The tool is arranged at an angle to the axle of the tubing and is rigidly held by a block or standard $D^1$ which forms a part of the tube finishing or reducing mechanism. As clearly shown in Figs. 3 and 4 the tool is vertically adjustable on the end $C^2$ of an arm $C^3$ which is fastened to and overhangs the top of the standard $D^1$. As the tubing travels beneath the sharp edge of the planer tool the latter turns, cuts or scrapes off the bur, leaving the top of the tubing as smooth as other surfaces thereof, and making the seam practically invisible.

I have hereinbefore referred to the fact that one of the important purposes of my invention is to provide for the continuous welding of tubing. This makes it desirable that the metal shall pass through successive stages at a constant maximum rate of speed and without interruption in the travel thereof. This is accomplished by the automatic vise or traveling mechanism E. In the machine shown the continuous vise E draws the tubing through the die $A^{15}$ and the seam positioner, through the rolls $B^2$ and through the deburring device, maintaining the tubing under constant tension. The vise mechanism which I have illustrated has two opposed traveling gripping portions $E^1$, $E^1$, divided into and composed of pairs of sections or jaws $E^2$ which move successively into alinement with and automatically clamp the tubing as the vise travels. The compressive force with which the vise clamps the tubing is sufficient to take firm hold upon it and draw the tubing along without distorting it. The jaws $E^2$ are arranged in pairs and are mounted upon two parallel endless chains $E^3$ running over corresponding sprockets $E^4$ and $E^5$ respectively, which being driven by suitable gearing cause the jaws to travel constantly in one direction and at a constant rate of speed. The principal source of power for the machine is in the chain belt $E^{35}$ which drives the continuous vise E. It will be observed that the continuous drawing effort of the traveling vise in pulling the tubing through the die $A^{15}$ continuously maintains the tubing under tension while moving it forward at a constant rate of speed. The positioning device which has been described, or any suitable or sufficient equivalent thereof, causes the seam of the tubing to conform to a vertical plane which includes the axis of the tubing. The rolls $B^2$ are positioned as shown for engagement with the tensioned portion of the tubing. They furthermore serve to hold the seam edges of the tubing together with as much force as may be required or desirable in the making of a continuous or progressive weld at the seam. These rolls also serve to carry away the heat from the major portion of the tubing and to maintain the tubing at a temperature so low as to prevent possible disruption or stretching of the tubing by the stretching force of the draft mechanism. Furthermore these rolls perform still another and an important function; their upper edges rise to a considerable height above the seam edges of the tubing and virtually form a moving walled groove or heat retaining channel or oven which serves to limit or confine the flame and the heat of the torch to the immediate seam edges. It will now be clear that the tubing as it moves past the point of heat application is held positively against lateral movement in any direction, the welding heat is limited to the seam edges and substantially the maximum tensile strength of the tubing is continuously maintained through the effective chilling of all parts of the tubing, circumferentially considered except those edge portions to which the welding heat is applied. The welding torch flame is definitely located with respect to the seam edges, by means of the supporting and adjusting parts hereinbefore described and any slight inaccuracy in the position of the flame may be readily corrected by means of the adjusting parts. I regard it as important that the welding torch shall, as hereinbefore described, be supported in such manner that it may be moved out of welding position at any time and instantly restored to welding position without necessity for any delicate readjustment of the nozzle with respect to the tubing. The slight bur which is raised upon the seam by the progressive welding operation is not always objectionable but where its presence would be objectionable it may be readily removed in the course of the welding operation by resort to the deburring device above dsecribed.

I desire that it be understood that other means than the continuous vise herein shown may be employed for imparting longitudinal movement to the tubing, without departing from the spirit or scope of my invention. This is particularly the case where this welding mechanism is to be employed in connection with relatively short lengths of open-seamed tubing.

While the welding mechanism herein illustrated is constructed to make tubing, I wish it to be understood that my invention is adapted to the production of similar or different metal articles. Indeed, various modifications of my invention and various combinations and uses of the mechanism herein described, all within the scope of my invention, subject only to express limitations in the claims, will readily suggest themselves to one who is skilled in the art.

Having thus described my invention, I claim as new and desire to secure by Letters Patent:

1. A continuous tube mill which comprises a seam positioner which causes the seam of the tubing to conform to a straight line, in combination with rotary means for holding the tubing at one point against lateral movement in any direction and formed to expose the seam edges of the tubing at that point, a seam welder for welding such exposed seam edges at the exposed point, means being provided for driving the tubing forward.

2. A continuous tube mill which comprises a seam positioner which causes the seam of the tubing to conform to a straight line, in combination with rotary means for holding the tubing for welding purposes at one point against lateral movement in any direction and formed to expose the seam edges of the tubing and press them together at that point, means being provided for driving the tubing forward.

3. A continuous tube mill comprising a seam positioner adapted to straighten the seam of a longitudinally seamed metal tube moving therethrough, in combination with rotary means operatively alined with said positioner for holding the tube against lateral movement in any direction at one point in its travel said means being formed to expose the seam edges of the tube at that point and to chill the circumferential remainder thereof at the said point, a gas torch positioned to deliver a welding flame upon said edges of the tube at said point and means for imparting longitudinal movement to the tube.

4. A continuous tube welding mechanism comprising relatively fixed means for subjecting a longitudinally seamed metal tube to tension and simultaneously moving it longitudinally at a constant rate of speed, in combination with rotary devices positioned at one point in the travel of the tensioned tube and at that point serving to hold the tube against lateral movement in any direction, and expose its seam edges, and welding means for progressively uniting the seam edges thus held and exposed.

5. A continuous tube welding mechanism comprising relatively fixed means for subjecting a longitudinally seamed metal tube to tension and simultaneously moving it longitudinally at a constant rate of speed, in combination with rotary devices positioned at one point in the travel of the tensioned tube and at that point serving to hold the tube against lateral movement in any direction, said devices being formed to circumferentially engage the tube and yet expose the seam edges thereof at said point, and welding means for progressively uniting the seam edges thus held and exposed.

6. A continuous tube welding mechanism comprising relatively fixed means for subjecting a longitudinally seamed metal tube to tension and simultaneously moving it longitudinally at a constant rate of speed, in combination with rotary devices positioned at one point in the travel of the tensioned tube and at that point serving to hold the tube against lateral movement in any direction, said devices being formed and adapted to press the seam edges of the tube together and expose them at said point, and a gas torch having a nozzle positioned to direct a welding flame upon the seam edges thus progressively held and exposed.

7. A continuous tube welding mechanism comprising relatively fixed means for imparting longitudinal movement to a longitudinally seamed metal tube, in combination with rotary devices positioned at one point in the travel of the tube and at that point serving to hold the tube against lateral movement in any direction, said devices being formed and adapted to press the seam edges of the tube together and expose them at said point, and a welding torch for progressively uniting the seam edges where thus held and exposed.

8. A continuous tube welding mechanism comprising relatively fixed means for subjecting a longitudinally seamed metal tube to tension and simultaneously moving it longitudinally at a constant rate of speed, progressive seam-positioning means, rotary devices positioned at one point in the travel of the tensioned tube and at that point serving to hold the tube against lateral movement in any direction, said devices being formed and adapted to press the seam edges of the tube together and expose them while chilling the circumferential remainder of the tube at said point, and welding means operative at said point for progressively uniting the seam edges thus held and exposed.

9. A continuous tube welding mechanism comprising relatively fixed means for subjecting a longitudinally seamed metal tube to tension and simultaneously moving it longitudinally at a constant rate of speed, in combination with rotary devices positioned at one point in the travel of the tensioned tube and at that point serving to hold the tube against lateral movement in any direction and expose its seam edges, welding means operative at said point for progressively uniting the seam edges thus held and exposed and a deburring device positioned to receive the tube as it leaves said point.

10. A continuous tube mill adapted to weld longitudinally seamed metal tubing comprising opposed rotary devices fitted to the tubing and adapted to hold the tubing at one point against lateral movement in any direction, said devices being formed to expose the seam edges of the tubing and also forming heat retainers or localizers adjacent the exposed edges in combination with a torch adapted to deliver a welding flame upon the edges of the tubing between said rotary devices.

11. A tube mill adapted to weld longitudinally seamed metal tubing comprising opposed rotary devices fitted to the tubing and at one point serving to hold the tubing against lateral movement in any direction, in combination with means for moving the tubing through said holding means at a constant rate of speed, said holding means being formed to expose the seam edges of the tubing and chill the circumferential remainder thereof at said point, and a gas torch adapted to direct a welding flame upon said seam edges between said rotary devices.

12. A mill for welding longitudinally seamed metal tubing comprising rotary holding means in combination with means for moving tubing through said holding means, said holding means being formed to expose the seam edges of the tubing and press them together, and a gas torch adapted to deliver a welding flame upon said seam edges where thus exposed and pressed together.

13. The herein described mechanism for welding longitudinally seamed tubing while the same is in longitudinal motion comprising rotary holding means for holding the moving tubing against lateral movement in any direction at one point in the travel thereof, in combination with a welding torch adapted to deliver a welding flame upon the seam edges of the tubing at said point.

14. A progressive tube welding mechanism, comprising opposed rotary tube holders formed to receive and guide a longitudinally moving metal tube and progressively expose the seam edges thereof in combination with a welding torch having its nozzle positioned between said holders, substantially as described.

15. A progressive welding mechanism, comprising opposed rotary tube holders formed to receive and guide a longitudinally moving tube and both press together and progressively expose the seam edges thereof in combination with a welding torch having its nozzle positioned between said holders, substantially as described.

16. The progressive welding mechanism herein described comprising holding devices and a welding torch adjacent thereto, in combination with means for cooling the article as it leaves said torch, a deburring device and means for longitudinally moving the article with respect to said devices and torch, substantially as described.

In testimony whereof, I have hereunto set my hand, this 5th day of April, 1912, in the presence of two subscribing witnesses.

MARSHALL BURNS LLOYD.

Witnesses:
CHARLES GILBERT HAWLEY,
C. O. PORTERFIELD.